Oct. 25, 1932. J. GOMBAR Re. 18,636

DAVENPORT

Original Filed April 19, 1926 2 Sheets-Sheet 1

Inventor:
JOSEPH GOMBAR,
By John H. Bunnings
His Attorney.

Oct. 25, 1932. J. GOMBAR Re. 18,636

DAVENPORT

Original Filed April 19, 1926 2 Sheets-Sheet 2

Inventor:
JOSEPH GOMBAR,
John N. Bruninga
His Attorney.

Reissued Oct. 25, 1932 Re. 18,636

UNITED STATES PATENT OFFICE

JOSEPH GOMBAR, OF LENOX, MICHIGAN, ASSIGNOR TO SMITH AND DAVIS MANUFACTURING COMPANY, OF ST. LOUIS, MISSOURI, A CORPORATION OF MISSOURI

DAVENPORT

Original No. 1,741,153, dated December 31, 1929, Serial No. 102,923, filed April 19, 1926. Application for reissue filed February 24, 1931. Serial No. 517,973.

My invention relates to new and useful improvements in a davenport, and has for its object the provision of a davenport which may be, when folded outwardly into operative position, used as a bed.

It is an object of the present invention to provide a structure permitting of this dual use and provided with supports automatically adjustable to operative or inoperative position depending upon the use to which the davenport is put.

Another object of the invention is the provision of a structure of this class which when swung to position for use as a bed will afford a rigid and durable structure.

Another object of the invention is the provision of a plurality of collapsible end folding parts adapted to automatically move into their folded position upon swinging of one part of the davenport into a certain position.

Another object of the invention is the provision on the bed of end supports adapted for affording abutments when the device is used as a bed and for serving to retain the mattress and bed clothes in position when the device is being folded into position for use as a davenport.

Another object of this invention is to provide folding connections for such a davenport bed which are simple in construction and which will operate smoothly during the folding and unfolding movements.

Other objects will appear hereinafter.

The invention will be best understood from a reference to the accompanying drawings which form a part of this specification and in which, Fig. 1 is a perspective view of a davenport embodying the invention in its outwardly folded position.

Figure 4:
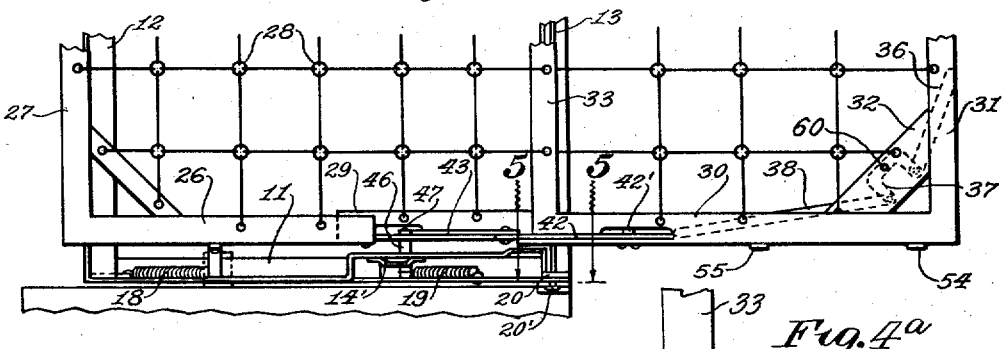
Fig. 4 is a fragmentary top plan view taken on substantially line 4—4 of Fig. 3.
Figure 4A:
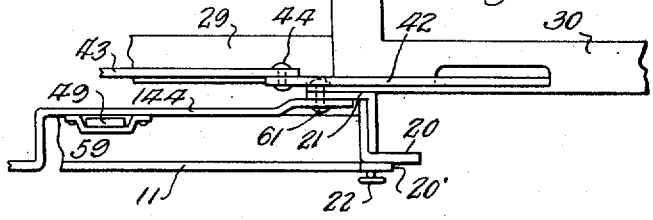

Fig. 4*a* is an enlarged detail of Figure 4.

Figure 5:
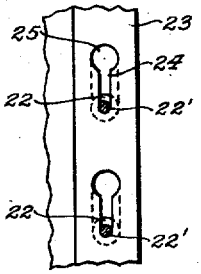

Fig. 5 is a fragmentary side elevational view of a supporting member which is mounted on the davenport frame.

The invention is adapted for use with a davenport having an upholstered back 8 and side arms 9. The davenport comprises a frame having at opposite sides cross members 11 connected by side rails 12 and 13. The construction at each side of the davenport is similar so that a description of one side only is given herein. Pivotally connected at one end to the cross member 11 at 14′ and projecting upwardly therefrom is a support 14. Pivotally connected at one end to the cross member 11 at 15′ and projecting upwardly therefrom is a support 15. Connected to the cross member 11 and braced by the brace 17 is an upright support 16, a spring 18 serving to connect the support 15 with the brace 17. Projecting upwardly from the cross member 11 is a support 20 upon which is mounted a strap 20′ having a plate 21 secured thereto.

Figure 1:
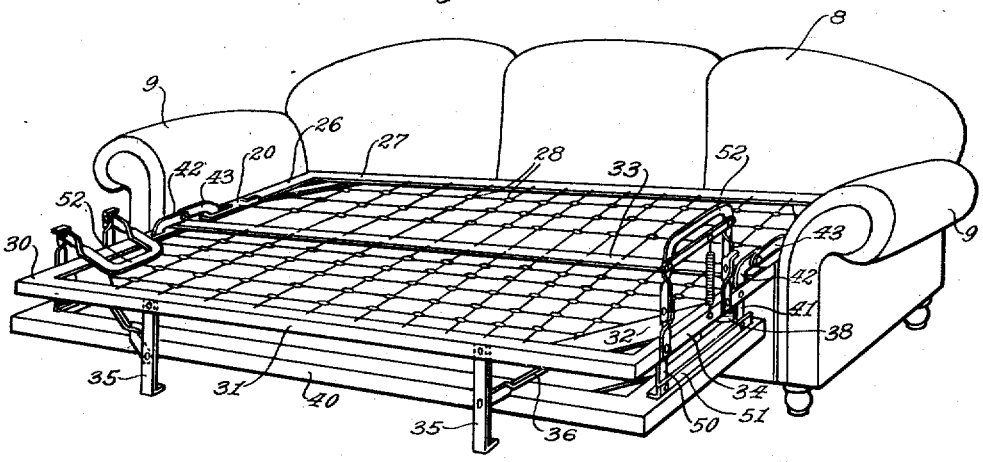

A brace 144 is fixed at 15′ to the member 11 and extends upwardly and forwardly, being bent to provide an upper horizontal portion fixed at its end to the plate 21. This brace has secured thereto a bent strap 59 providing a guide for the upper end of the pivoted support 14. Projecting outwardly from the strap 20′ are spaced studs 22′, each of which is provided with an enlarged head 22 spaced from the strap 20′. Secured to the frame of the davenport proper (this frame of the davenport not being shown in as much as it in itself forms no specific part of this invention and may be of any well known structure) is a strap of metal 23 having elongated slots 24 formed therein and communicating at one end with an enlargement 25, the arrangement being such that the head may be projected through the enlarged portion 25 and thence moved downwardly so that the studs 22′ are in engagement, when in the slots 24 thus serving to lock the frame of the invention securely upon the frame of the davenport with which used. A U-shaped frame having legs 26 and a bight 27 is formed from angle-iron or other suitable material and pivotally connected at one end to the link 29 at 29″, the opposite end of said link being pivotally connected at 61 to a side rail 30 of the frame embodying the rails 30, 31, 33 and 34 and to the supporting plate 21. As shown in Fig. 1 the rails 30 and 34 are each connected to the rail 31 by the diagonally extending brace 32. Thus the frame 26, 27 forms an inner section, the frame 30, 31, an outer section and the links 29 an intermediate section of a folding bed frame.

Figure 3:
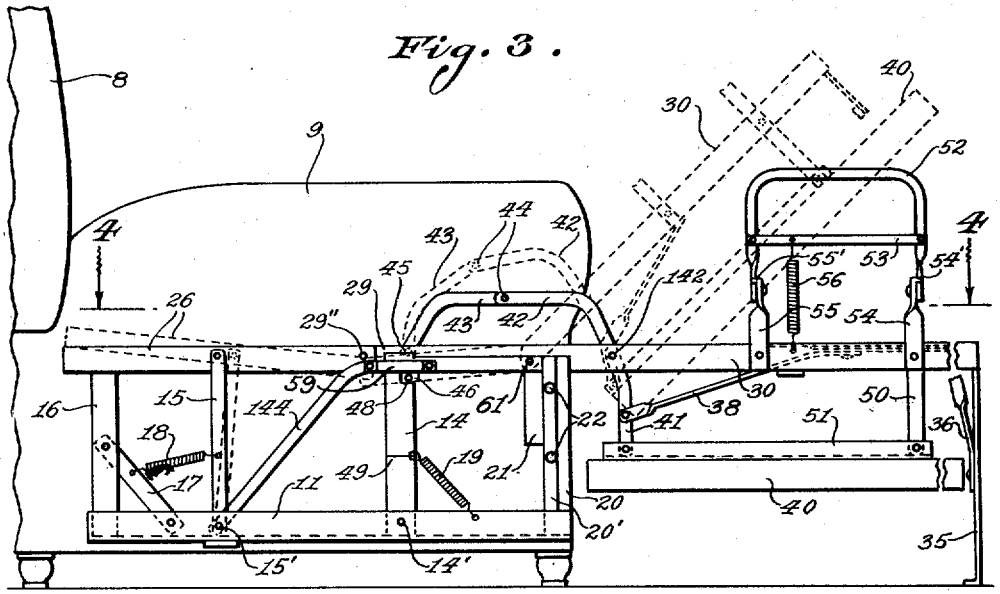
Fig. 3 is an end elevational view of the invention in its outwardly moved position showing it applied to a davenport.

Pivotally connected at one end to the rail 31 in spaced relation are supporting legs 35 to each of which is pivotally connected at one end an operating arm 36, the other end of said arm 36 being pivotally connected to one of the legs of the U-shaped bracket 37, pivoted at 60 on the brace 32, the other leg of which is pivotally connected to an arm 38. Connecting the rail 30 to the seat frame 40 are links 50, an angle iron 51 being secured to the undersurface of the seat frame 40. The frame 40 may be termed an auxiliary frame. Pivoted to the part 51 of the frame 40 is the lower end 41 of a bent arm pivoted at 142 to the rail 30 and having an upwardly extending portion 42 extending above the bed frame in the position shown in Fig. 3. The upper end 42 of this arm is pivoted at 44 to a second bent link 43, which in turn is pivoted at 45 to the link 29. The lower end of the arm 43 is bent forwardly below the pivot 45 and laterally to provide an angularly turned portion 46. The angularly turned portion 46 is positioned so as to enter a notch 48 in the upper end of the support 14 when the bed is in extended position as shown in Fig. 3. The arms 42 and 43 extend thru suitable slots in the horizontal flanges of the rail 30 and the link 29 respectively, so as to permit movement of said arms.

Connected to the rail 30 and projecting upwardly therefrom are supports 54 and 55, each of which is provided at its upper end with an angularly turned tongue 54′ and 55′ respectively, for limiting the swinging movement of U-shaped abutment 52 which is pivotally connected at the ends of its legs to the supports 54 and 55. As shown in the drawings a spring 56 is used to retain this abutment in upright position.

Figure 2:
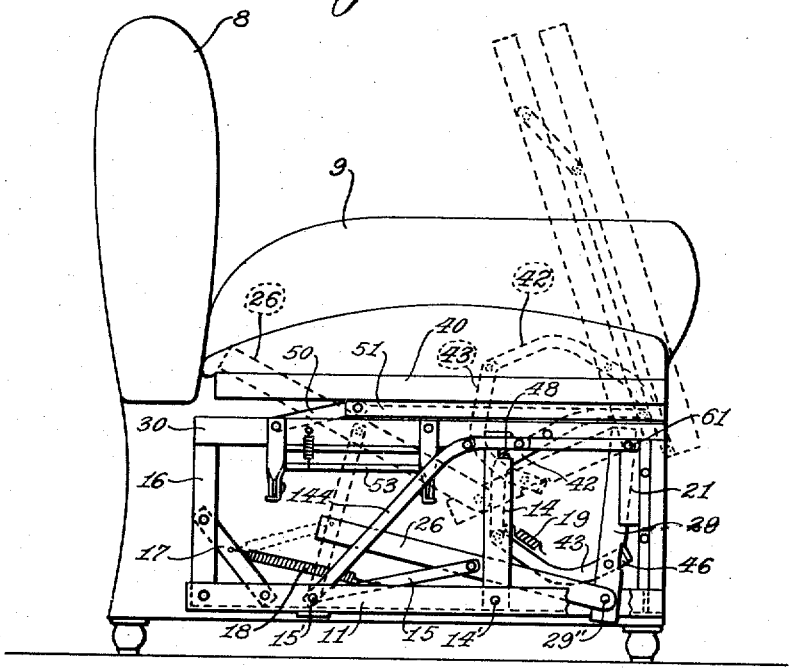
Fig. 2 is a side elevational view of the invention showing it applied to a davenport in its collapsing position.

When the device is used as a davenport it is folded into the position shown in Fig. 2, and when it is desired to use the device as a bed it is folded into the position shown in Fig. 1, suitable bed springs 28 being connected to the rails and cross-members as shown in the drawings.

When the device is in the position shown in Fig. 1 the U-shaped abutments 52 are raised into upwardly projected position so as to serve the obvious purpose.

Preliminarily to folding the device upon its axis, the abutments are folded inwardly toward each other so as to serve as a retaining member for the mattress, bed clothes and the like.

With the device in folded position as shown in Fig. 2, the bed is extended by lifting the inner edge of the seat frame 40 as indicated in dotted lines in Fig. 2. This causes the frame 30, 31, 33, 34, to swing on its pivot 61. This movement causes the arm 42 to swing upwardly so as to draw the arm 43 upwardly. This upward movement of the arm 42 is assisted by the weight of the seat frame 40 which during this part of the movement rests upon the lower end 41 of said arm. The arm 42 thus provides, in effect, a cantilever on the section 30 which carries the link 43 at its outer end. The upward pull on the arm 43 swings the link 29 upwardly. This link also pivoting at 61, moves the member 26 rearwardly, thereby swinging the support 15 upwardly on its pivot so as to carry the frame 26, 27, to its upper horizontal position as shown in Fig. 3. During the continued outward movement of the member 30 the weight of the seat frame continues to force the arm 42 upwardly so as to pull up on the arm 43 and the link 29, thereby carrying said link into a position of alinement with the frame 26. During the latter part of this movement, the angularly turned portion 46 comes into engagement with the front edge of the pivoting support 14 forcing the latter rearwardly against the pull of the spring 19. As the movement is completed the portion 46 snaps into the notch 48 thereby locking the frame in extended position as shown in Fig. 3.

When it is desired to collapse the structure, the reverse movement is carried out, the frame 30, 31 is lifted so as to swing on its pivot 61. This carries the arm 42 upwardly as indicated in dotted lines in Fig. 3, the weight of the seat frame 40 still maintaining a lifting action on the arm 43. As the movement continues the arm 43, pivoting at 45, carries the latch portion 46 forwardly until it clears the notch 48, after which the link 29 is moved downwardly on its pivot thereby carrying the frame 26 downwardly and forwardly to its folded position as shown in Fig. 2.

In Fig. 2 and in Fig. 1, I have shown the device as partly folded over in dotted lines to indicate the operation of the various parts. The arm 38 serves, upon movement of the frame having the rail 31 a predetermined distance, to rock the U-shaped member 37 on its pivot. This rocking will serve to rock the legs 35 on their pivots inwardly toward each other so as to fold them into parallel relation to the rail 31. Similarly when the device is unfolded a certain distance this U-shaped member will be rocked in the opposite direction to move the legs 35 into vertical relation to the rail 31 so as to form the necessary supports.

While I have illustrated and described the precise form of structure, I do not wish to limit myself to the precise form of structure shown but desire to avail myself to such variation and modifications as come within the scope of the appended claims.

Having thus described the invention what is claimed is:

1. A davenport of the class described comprising, a supporting frame, a frame having means by which it is swingably mounted on said supporting frame and adapted in one position for folding over said supporting frame and lying above it and in another position for forming an extension on said supporting frame, a link pivoted to the swingable frame and adapted to swing from a vertical depending position to a position in horizontal alignment with the extended swingable frame, a support projecting upwardly from the lower part of the supporting frame and provided with a notch near its upper end, a toggle comprising two links pivoted together and pivoted at one end on the swingable frame and at its other end on the link and provided with means engaging the notch when the link and frame are horizontally aligned whereby the link is supported and locked in horizontal position.

2. A davenport of the class described comprising, a supporting frame, a frame having means by which it is swingably mounted on said supporting frame and adapted in one position for folding over said supporting frame and lying above it and in another position for forming an extension on said supporting frame, a support projected upwardly from the lower end of said supporting frame and provided with a notch in its upper end, a toggle connected at one end to said swingably mounted frame and engageable in one position for engaging in said notch and locking said swingably mounted frame against swingable movement, a supporting leg pivoted to said swingably mounted frame and adapted for swinging from operative to inoperative positions, a U-shaped member, means by which the U-shaped member is pivotally mounted on the swingable frame, an operating arm pivotally connected at one end to the supporting leg and at the other to one leg of the U-shaped member, a second arm pivotally connected at one end to the other leg of the U-shaped member and at the other to an extension of one of the toggle links whereby rocking of said toggle incident to swinging the sections effects swinging of the leg from one position to another and a seat section connected to the extremity of said toggle extension.

3. A folding davenport of the character described, comprising, a supporting frame, a folding bed frame having inner and outer sections and an intermediate section jointed therebetween to provide for movement thereof to extended and collapsed positions, means for pivoting said intermediate and outer sections on said supporting frame, means to connect said rear section to said supporting frame for movement forwardly and downwardly to collapsed position; a lever pivoted between its ends to said outer section and having one end projecting toward and overhanging said intermediate section when said outer section is in nearly extended position, a link connecting the outer end of said lever to the folding frame close to the joint between said inner and intermediate sections, adapted to apply a lifting force directly to said joint in order to raise said sections when said outer section is moved to extended position, and a seat frame connected to the other end of said lever so as to apply its weight to the lifting force at said joint to assist in raising said inner section.

In testimony whereof, I affix my signature this 13th day of January, 1931.

JOSEPH GOMBAR.